United States Patent [19]
Burger et al.

[11] Patent Number: 5,311,208
[45] Date of Patent: May 10, 1994

[54] MOUSE THAT PRINTS

[75] Inventors: William R. Burger; Bruce J. Parks, both of Fairport; Edward C. Hanzlik, Webster, all of N.Y.

[73] Assignee: Xerox Corporation, Stamford, Conn.

[21] Appl. No.: 770,273

[22] Filed: Oct. 3, 1991

[51] Int. Cl.$^5$ .............................................. G09G 3/02
[52] U.S. Cl. .................................. 345/163; 345/157; 358/473
[58] Field of Search ..................... 340/710, 706, 709; 358/296, 472, 75, 473, 474; 345/163, 167, 169, 157, 156

[56] References Cited

U.S. PATENT DOCUMENTS

| | | |
|---|---|---|
| 4,545,695 | 10/1985 | Agata . |
| 4,804,949 | 2/1989 | Faulkerson .......................... 340/710 |
| 4,833,491 | 5/1989 | Rezanka ................................. 358/75 |
| 4,862,390 | 8/1989 | Weiner ................................. 340/710 |
| 4,915,027 | 4/1990 | Ishibashi et al. . |
| 4,944,695 | 7/1990 | Anglehart ............................ 358/473 |
| 4,949,283 | 8/1990 | Yamauchi et al. . |
| 4,984,287 | 1/1991 | Massouni ............................ 340/710 |
| 5,126,955 | 6/1992 | Tomoda ............................... 345/163 |

FOREIGN PATENT DOCUMENTS

3314041A1 10/1984 Fed. Rep. of Germany .
1281517 1/1989 Japan .
WO92/16375 10/1992 PCT Int'l Appl. .

Primary Examiner—Ulysses Weldon
Assistant Examiner—Regina Liang
Attorney, Agent, or Firm—Oliff & Berridge

[57] ABSTRACT

An electronic input/output apparatus for a computer system which includes a computer and a computer screen, includes a mechanical mouse and a printhead integral with the mouse, both being attached to the computer through an electrical interconnection means. The mouse is represented by a cursor on the computer screen based on movement of the mouse. The electrical interconnection means provides data signals between the computer and the electronic input/output apparatus for the mouse and additionally for the printhead which is capable of printing data displayed on the computer screen which has been passed over by the cursor. The printhead, upon activation by a print button or the like, prints onto a substrate as the I/O apparatus is moved across the substrate. Control of the printing operation is done by monitoring and controlling the data sent to the printhead based on positional and velocity values obtainable by a tracking mechanism within the mouse.

15 Claims, 2 Drawing Sheets

FIG. 1
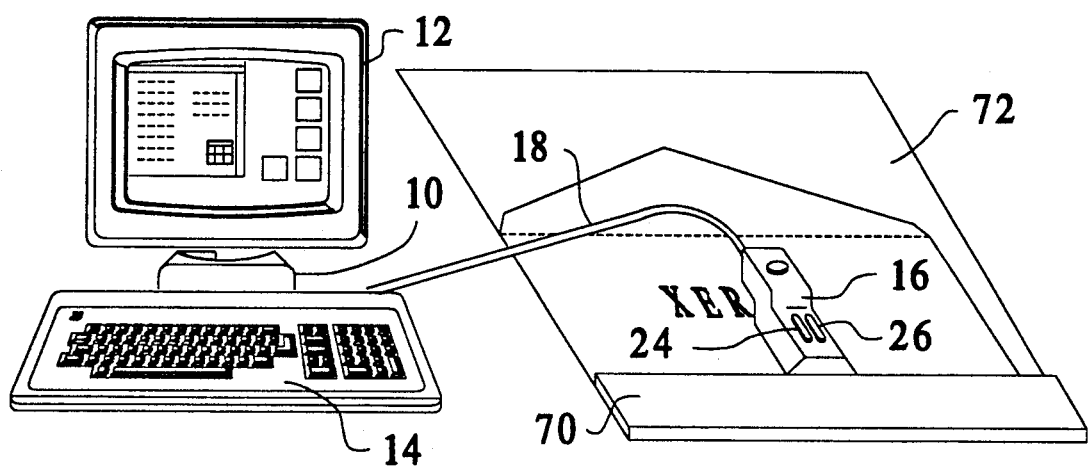
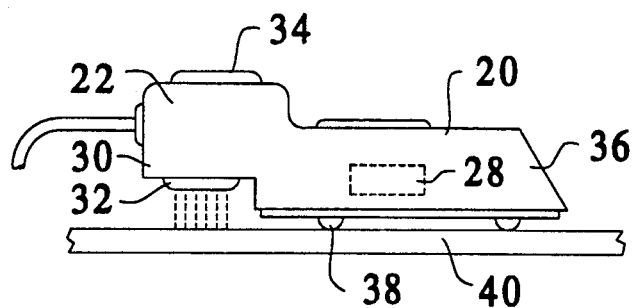
FIG. 1A
FIG. 1B

MOUSE THAT PRINTS

BACKGROUND OF THE INVENTION

1. Field of the Invention

The present invention relates to a computer mouse which includes a printer and more specifically, a mechanical mouse which includes an ink jet printer which receives signals representing data displayed in a region selected on a computer screen by the mouse. As the mouse moves, the printer will eject drops of ink which correspond to the data in the selected region.

2. Description of Related Art

U.S. Pat. No. 4,412,232 to Weber et al. discloses an ink jet printer which is hand held and includes a printhead and a sensing device. The sensing device generates timing pulses which are sent to a computer and used for controlling the printhead. The printhead uses piezoelectric elements to print data onto a sheet of paper. The printhead and the sensing device are connected to a computer by an electrical connection.

U.S. Pat. No. 4,999,016 to Suzuki et al. discloses a hand recording apparatus wherein data is printed onto a recording medium by a thermal printhead. The printhead is driven based on signals from an encoder plate and a photosensor which detect movement of the entire apparatus. Data is recorded from a keyboard of a wordprocessor into a RAM and then read out of to the recording apparatus whenever the recording apparatus is activated.

U.S. Pat. No. 4,750,049 to Murakami et al. discloses a hand held copying apparatus which includes an encoder, a reading device, a controller, a storage device, a recording device and a monitoring device. The monitoring device is an LCD and the recording device is a thermal head. Data is read into the apparatus, stored for a variable amount of time and outputted to a piece of paper by the thermal head. A button on the apparatus is depressed to switch between the recording and the reading functions. The encoder generates timing pulses which are used to synchronize the reading device and the recording device.

U.S. Pat. No. 4,901,164 to Kurosawa discloses a hand scanner image input/output apparatus wherein an object is scanned by a scanning element within the input/output device and then printed onto a piece of paper using a thermal printhead. The thermal printhead is moved into an active region prior to printing and an inactive position during scanning.

None of the known existing printing systems combine a mouse with a thermal ink jet printer to form a device capable of both designating data on a computer screen and printing the data.

Thus, the need exists for a computer mouse which can perform routine pointing/designating functions associated with a computer mouse, while additionally providing the capability of printing selected information from a computer screen by depressing of a print button on the mouse and translationally moving the mouse across a recording surface to print thereon.

OBJECTS AND SUMMARY OF THE INVENTION

It is an object of the present invention to provide a computer mouse which is capable of providing printing functions.

It is another object of the present invention to provide a computer mouse capable of cursor selection of a portion of a computer screen for printing and then, upon depression of a print button on the mouse activating an ink jet printhead within the mouse to print the selected portion onto a recording medium over which the mouse is traversing.

To achieve the foregoing and other objects, and to overcome the deficiencies of the prior art, the present invention provides an electronic input/output (I/O) apparatus for a computer system having a computer screen. The electronic I/O apparatus incorporates a thermal ink jet printhead into a mouse where it can be utilized to print out information from the CRT screen. The I/O apparatus is attached to the computer through an electrical interconnection.

The mouse is represented by a cursor on the computer screen which moves on the screen relative to actual movement of the mouse and comprises at least one button for controlling mouse functions. The mouse can be utilized to provide normal routine mouse functions. Tracking mechanisms already present in most computer mice can be used as positional information to select portions of data from a computer screen. The I/O apparatus upon print activation can be used to print data selected on the screen onto a surface over which the I/O apparatus is traversed. Actual printing is controlled by sensing the direction and velocity of the I/O apparatus by the tracking mechanism or by appropriate operator entered direction values.

According to one embodiment of the present invention, the mouse includes a button for activating a highlight function of the computer for highlighting displayed data on the computer screen to be printed. The mouse preferably further includes a print button located on an external surface of the mouse for enabling printing by the printhead.

BRIEF DESCRIPTION OF THE DRAWINGS

The invention will be described in detail with reference to the following drawings in which like reference numerals refer to like elements and wherein:

FIG. 1 is a schematic perspective view of a computer system including a mouse having an integral printhead according to the present invention;

FIG. 1A is an enlarged side view of the mouse of FIG. 1;

FIG. 1B is an enlarged edge view of the guide mechanism of FIG. 1;

DETAILED DESCRIPTION OF THE PREFERRED EMBODIMENTS

Figure 2:
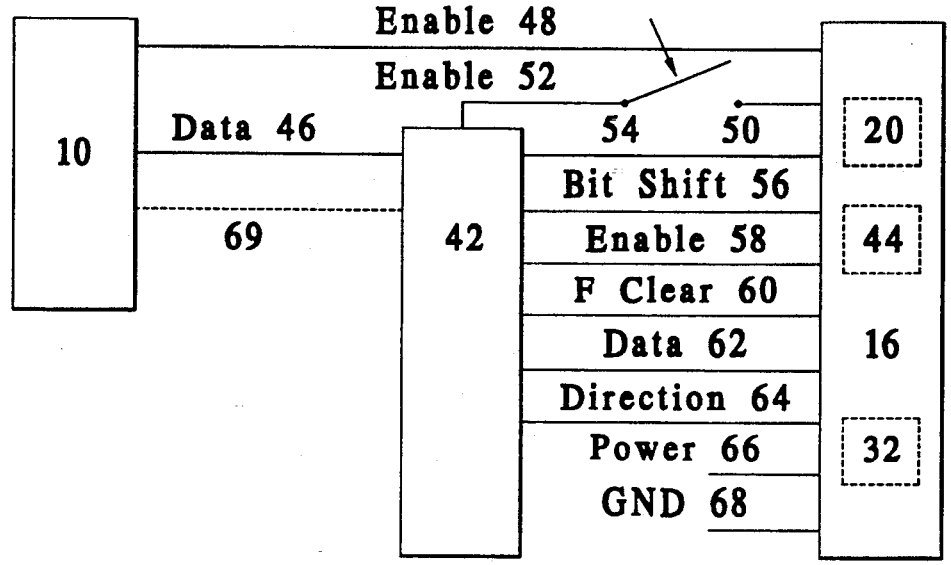
FIG. 2 is a circuit diagram of a computer input/output apparatus according to the present invention.

Referring to FIG. 1, there is shown a computer system 10 which comprises a computer (CPU) 10, a computer screen (Monitor) 12, a keyboard 14, and an input/output apparatus 16. The I/O apparatus 16 is connected to the CPU 10 through electrical interconnection 18. The I/O apparatus 16 comprises a mouse 20 having an integral printhead portion 22. The mouse performs normal mouse features known to those skilled in the art through function buttons 24, 26 which control pointing functions of the mouse 20 and tracking mechanism 28. The printhead portion 22 of the mouse 20 includes a support housing 30, a printhead 32, and a print enable button 34. The interconnection means 18 includes additional data communication lines (other than those necessary for normal mouse features) for electrically connecting the printhead 32 with the mouse 20 and the computer 10. The support housing 30 is located preferably, as shown, on a forward facing end of the mouse and being slightly elevated from a mouse main housing 36. The printhead 32 protrudes below the support housing 30 a nominal distance such that the printhead 32 is located a predetermined distance above a lower extremity of the mouse 20. As shown, the mouse 20 includes a ball means 38 (which is part of the tracking mechanism 28) connected to the mouse 20 and translatable with respect to movement of the mouse 20 over a surface such as paper 40. The ball means 38 along with appropriate electronics of the tracking mechanism 28 is used to precisely determine the exact spatial orientation and relative translational movement of the mouse 20 which is sent to the computer 10 as positional data. Such positional tracking is disclosed in U.S. Pat. No. 3,835,464 to Rider and U.S. Pat. No. 3,892,963 to Hawley et al., both assigned to Xerox Corporation and incorporated herein by reference. In the present system, this data can be used by a controller 42 to determine when the printhead 32 should be activated to enable printing of the printhead 32 onto a surface of paper 40 based on positional data and velocity data. A mouse controller is disclosed in U.S. Pat. No. 3,911,419 to Bates et al., assigned to Xerox Corporation and incorporated herein by reference.

FIG. 2 shows an electronic control system for the I/O apparatus 16. It comprises a host computer system 10 which may be a Xerox 6085 system. The I/O apparatus 16 which comprises a mouse 20 having an encoder 44 and a printhead 32 is electrically connected to the host system 10 through electrical interconnection 18 comprising a plurality of signal and data lines. A suitable interconnection 18 is shown which comprises a data line 46 which connects from the host 10 to controller 42. An enable signal line 48 is connected at one end thereof to the host 10 and is connected at the other end thereof to a first lead 50 of print enable button 34 of the I/O apparatus 16. Another enable line 52 is located between the controller 42 and a second lead 54 of the print enable button 34. Depression of the print button 34 allows data to flow through the enable lines 48 and 52. Other interconnection lines include a bit shift line 56, an enable line 58, a F clear line 60, a data line 62 and a direction line 64, all of which run between the controller 42 and the I/O apparatus 16. The I/O apparatus 16 also includes a power and a ground line 66 and 68, respectively.

Information designated on the monitor 12 to be printed by the mouse 20 can be selected in many ways. The information can be highlighted and then printed by depressing the print button 34 on the mouse 20 while moving the mouse along a surface of paper 40 to be printed thereon. Another way would be to select the print function via keyboard 14 or by scanning a cursor across the information on the screen or other menu-driven techniques. Preferably, the mouse 20 is used to position the cursor at a start point of information to be printed, and through appropriate standard mouse techniques, mark the start position and either box in or highlight a region through movement of the mouse 20 to select a portion of the computer screen 12 for printing.

The printhead 32 used with the mouse 20 may be of any type although preferred printheads print one line at a time and range in width from 0.25" to 0.6" and are capable of scanning velocities up to 15 inches/second for compatibility with hand held printing requirements. Suitable printheads that are communically available are the Hewlett Packard Desk Jet, Desk Jet Plus and Desk Writer Cartridges, and the Cannon BC-01 cartridge as in the Canon BJ-10E and Apple Style Writer. The preferred printheads are drop-on-demand printheads which will eject drops of ink corresponding to the information selected on the screen and will drop ink at a rate based on translational data including positional and velocity values which are available through tracking mechanisms found in conventional computer mice. For example, the printing mechanism of U.S. Pat. No. 4,412,232 to Weber et al., incorporated by reference herein, could be used in the printhead portion of the present invention to provide printing capabilities to the mouse.

In a preferred embodiment, the apparatus further includes a guide device 70 (FIG. 1B) such as a straightedge which engages an inclined surface of the mouse 20 to locate the mouse 20 in a correct position for accurately traversing the mouse 20 across a substrate such as paper or envelopes to ensure a straight print line. Preferably, in this embodiment, the guide device 70 is movably secured to a support 72, which can be of suitable dimensions, through a linkage 74 to provide a base for the substrate while allowing the guide to vertically traverse the support 72. This allows the I/O apparatus 16 to print accurately at many locations on a substrate.

The I/O apparatus 16 also has the ability to be used freehand. This allows the freedom to print on many surfaces which cannot be printed on by conventional printers. It also allows the flexibility to print on non-linear lines such as around curves.

Figure 3:
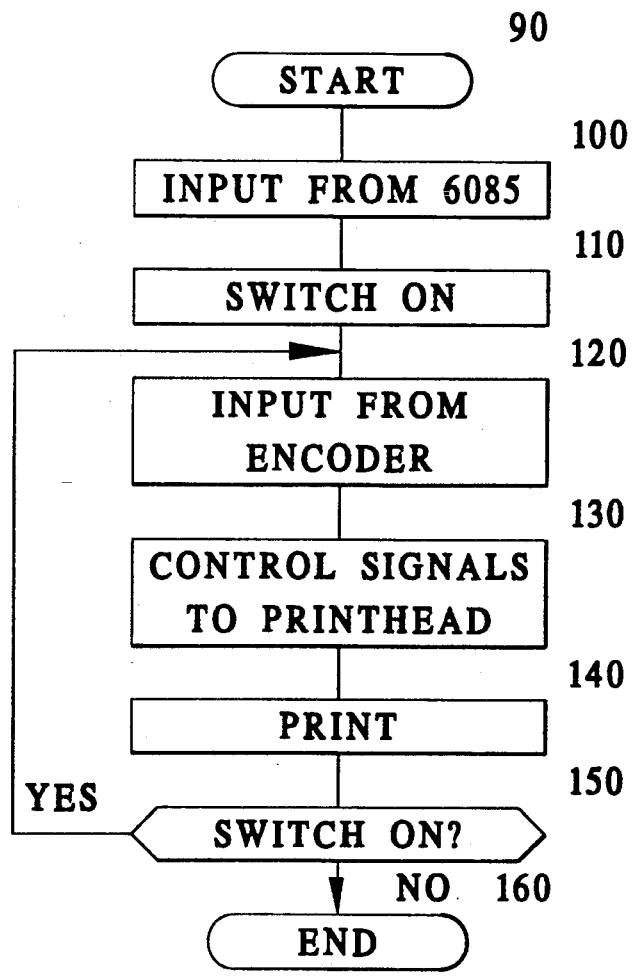
FIG. 3 is a flow diagram of a print sequence utilized by the present invention of FIG. 1.

With reference to FIG. 3, there is shown the print sequence of the present invention. When a print function is selected in the host system 10 (STEP 90), the data to be printed can be loaded into a buffer in the controller 42 or can reside in the host system 10 where the data can be retrieved as needed via signals from the controller 42 (STEP 100).

In order to print the information selected on the screen, an operator depresses and holds the print button 34 on the I/O apparatus 16. The controller senses the depression of the button 34 (STEP 110) and allows data transfer to the I/O apparatus 16. However, printing will not occur until the I/O apparatus is moved. Movement of the I/O apparatus 16 generates an encoder pulse (STEP 120). Control electronics in the controller 42 having detected the encoder pulse and the enable signal sends the appropriate data to the printhead to be printed (STEP 130). Only one pulse per ink jet is generated for each encoder pulse (STEP 140). An example of this is the printing of a solid line in which all jets of the printhead would be fired once during the duration of one encoder pulse. After a line is printed, the controller looks to see if the enable signal is present (STEP 150), which is the depression of print enable button 34. If the switch is depressed and data still is present, the controller 42 will repeat the cycle. If the signal is not present, the sequence will end (STEP 160).

In one embodiment, the data on the screen which is being scanned by the mouse apparatus can be printed by the printhead as the computer screen is being scanned. In this embodiment, the I/O apparatus is positioned in a suitable location relative to a surface upon which data is to be printed. A suitable print function can be activated by keyboard or the like. Upon activation of the print button 34, the printhead portion will print information directly corresponding to a current portion of the computer screen being scanned as the I/O apparatus is being traversed around the screen. Upon deactivation of the print button 34, the print operation will cease.

The sequence in which the jets are fired is controlled by the direction signal 64. In some devices, this function can be fixed by the design of the printhead circuitry. In a preferred embodiment, the print sequence can be selected from jet 1-N or N-1. Optional means can be provided on the mouse or by command in the host system to allow selection of the printing direction by the operator shown as direction signal 69 in FIG. 2.

Recording information entered either by the I/O apparatus (mouse) or by keyboard is stored in a RAM in CPU 10. When the print enable button 34 is depressed and input from the encoder 44 has been received, the CPU 10 reads the recording information prestored in the RAM in response to the encoder signal, and supplies a data signal to the printhead 32 for printing the information. Depending on the encoder signals received, which depend on the rate of movement and direction of the I/O apparatus, the thermal printhead is driven in conformity with the encoder signals to reproduce the recording information stored in the RAM.

Preferably, the I/O apparatus utilizes a mechanical mouse because a mechanical mouse does not require a special tablet or positional pad as required by most optical mice. Optical mice may be utilized in certain applications, depending on the surface to be printed. A suitable optical mouse is the mouse described in U.S. Pat. No. 4,794,384 to Jackson, assigned to Xerox Corporation and incorporated herein by reference. The edge of the pad or at least a representative strip of the optical pad which generates pulses for the optical mouse must be placed somewhere in the vicinity of the media to be printed. One approach would be to attach a strip of the pad material to the straight edge which is used as a guide as shown in FIG. 1.

The invention has been described with reference to its preferred embodiments which are intended to be illustrative and not limiting. Various changes can be made without departing from the spirit and scope of the invention as described in the appended claims.

What is claimed is:

1. An electronic input/output apparatus for a computer system which includes a computer and a computer screen, said electronic input/output apparatus comprising:
    a mouse, attached to the computer through an electrical interconnection means, said mouse being represented by a cursor on said computer screen based on movement signals generated by a tracking mechanism within said mouse, said mouse being capable of scanning data from the computer screen in a scanning mode by passing over the data with said cursor;
    a printhead, attached to said mouse, for printing data displayed on said computer screen which has been passed over by said cursor onto a surface, said electrical interconnection means providing data signals between said computer and said electronic input/output apparatus; and
    control means for controlling said printhead to print information directly corresponding to a current portion of the computer screen being scanned by said mouse of said input/output apparatus as said cursor is traversed around the screen, said control means receiving the movement signals of said input/output apparatus from said mouse tracking mechanism.

2. The electronic input/output apparatus of claim 1, wherein said printhead is a thermal ink jet printhead.

3. The electronic input/output apparatus of claim 1, wherein said mouse includes a button for activating a highlighting function of the computer for highlighting data displayed on said computer screen.

4. The electronic input/output apparatus of claim 1, further comprising a print button, located on an external surface of said mouse for enabling said printhead.

5. The electronic input/output apparatus of claim 1, wherein said printhead is a drop-on-demand ink jet printhead.

6. The electronic input/output apparatus of claim 1, further comprising a guide means for guiding movement of said electronic input/output apparatus along a straight path on said surface.

7. The electrical input/output apparatus of claim 1, wherein said mouse is a mechanical mouse.

8. The electronic input/output apparatus of claim 1, further comprising a RAM for temporarily storing selected data for subsequent printing.

9. A method of outputting data directly from a computer having a screen, wherein the data is displayed on the computer screen, comprising the steps of:
    moving an electronic input/output apparatus to a starting position and activating a scanning mode;
    scanning and selecting data on said computer screen using said electronic input/output apparatus, by passing over the data with a cursor which represents the relative position of said electronic input/output apparatus on said computer screen;
    activating a printhead on said electronic input/output apparatus; and
    printing said selected data from said computer screen onto a surface using said printhead of said electronic input/output apparatus when said input/output apparatus is in the scanning mode to scan data on said computer screen.

10. The method of claim 9, further comprising the step of:
    highlighting data, during said scanning, on said computer screen; wherein said highlighted data is printed using said printhead.

11. The method of claim 9, further comprising the step of:
    moving said electronic input/output apparatus along a guide surface while printing to ensure aligned scanning and printing.

12. The method of claim 9, further comprising the step of highlighting said data during said scanning.

13. The method of claim 9, further comprising the step of:
    temporarily storing said selected data in a memory for subsequent printing.

14. A method of outputting data directly from a computer having a screen, wherein the data is displayed on the computer screen, the method comprising the steps of:
    moving an electronic input/output apparatus to a scanning starting position and activating a scanning mode;
    scanning data on said computer screen using said electronic input/output apparatus, by passing over the data with a cursor which represents the relative position of said electronic input/output apparatus, said cursor located on said screen moving relative to actual movement of said electronic input/output apparatus based on movement signals generated by a tracking mechanism within said input/output apparatus;

selecting data, during said scanning, on said computer screen;

activating a print apparatus on the electronic input/output apparatus while said electronic input/output apparatus is in the scanning mode; and printing said selected data onto a surface using a printhead of said electronic input/output apparatus, wherein said printhead prints information directly corresponding to a current portion of the computer screen being scanned by said input/output apparatus while said input/output apparatus continues to scan additional data, said printing information being controlled by direction and velocity information within said movement signals generated by said tracking mechanism.

15. The method of claim 14, further comprising the step of:

temporarily storing said selected data in a RAM for subsequent printing.

* * * * *